US012743965B2

(12) United States Patent
Rogers et al.

(10) Patent No.: US 12,743,965 B2
(45) Date of Patent: Sep. 22, 2026

(54) BRAILLE TIMER

(71) Applicant: Time Timer LLC, Cincinnati, OH (US)

(72) Inventors: Heather L. Rogers, Cincinnati, OH (US); Christen Sara Barbercheck, Cincinnati, OH (US); Tricia L. Wright, San Francisco, CA (US)

(73) Assignee: Time Timer, LLC, Cincinnati, OH (US)

( * ) Notice: Subject to any disclaimer, the term of this patent is extended or adjusted under 35 U.S.C. 154(b) by 196 days.

(21) Appl. No.: 18/933,322

(22) Filed: Oct. 31, 2024

(65) Prior Publication Data

US 2025/0329271 A1 Oct. 23, 2025

Related U.S. Application Data

(63) Continuation-in-part of application No. 29/938,104, filed on Apr. 18, 2024, now Pat. No. Des. 1,115,553.

(51) Int. Cl.
*G04B 25/02* (2006.01)
*G09B 21/00* (2006.01)

(52) U.S. Cl.
CPC ........... *G09B 21/003* (2013.01); *G04B 25/02* (2013.01)

(58) Field of Classification Search
CPC ....... G04B 25/02; G04B 25/04; G09B 21/003
See application file for complete search history.

(56) References Cited

U.S. PATENT DOCUMENTS

| | | | | |
|---|---|---|---|---|
| 1,544,333 A * | 6/1925 | Marks | G04F 3/027 968/813 |
| D79,861 S | 11/1929 | Streng | |
| D90,859 S | 10/1933 | Schmid | |
| 2,091,146 A * | 8/1937 | Hamilton | G04B 25/02 368/230 |
| 2,146,340 A * | 2/1939 | Jiskra | G04B 19/2538 968/185 |
| 2,177,234 A * | 10/1939 | Walser | G04B 25/02 368/230 |
| 2,208,366 A * | 7/1940 | Hamilton | G04B 25/02 368/230 |
| D124,980 S | 2/1941 | Rainbault | |
| 2,336,563 A * | 12/1943 | Nielsen | G04F 3/06 200/39 A |

(Continued)

FOREIGN PATENT DOCUMENTS

| | | |
|---|---|---|
| CN | 102467080 A | 5/2012 |
| GB | 982054 A | 2/1965 |

(Continued)

OTHER PUBLICATIONS

Reizen Braille Timepiece for Training, 1 page.
MaxiAids Braille Long Ring 60-Minute Mechanical Timer, 1 page.

*Primary Examiner* — Sean Kayes
(74) *Attorney, Agent, or Firm* — Wood Herron & Evans LLP

(57) ABSTRACT

A braille timer teaches time in a simple manner to visually impaired individuals. The timer rotates a shaft which rotates a colored disk attached to the shaft. The initial position of the colored disk is manually set by an operator using either an arm, a positioner or a portion of the colored disk. A raised annular ring enables the colored disk to rotate freely without interference from raised bumps indicating numbers in Braille.

19 Claims, 10 Drawing Sheets

(56) References Cited

U.S. PATENT DOCUMENTS

| | | | | |
|---|---|---|---|---|
| 3,648,647 | A * | 3/1972 | Joy | G04F 3/00 368/230 |
| 5,751,663 | A | 5/1998 | Johnson | |
| 6,574,165 | B2 | 6/2003 | Sharma et al. | |
| 7,079,454 | B2 * | 7/2006 | Wellen | G04B 25/02 368/230 |
| D583,686 | S | 12/2008 | Forakis | |
| D636,373 | S | 4/2011 | Miu | |
| D705,089 | S | 5/2014 | Rogers et al. | |
| D802,450 | S | 11/2017 | Boynton et al. | |
| 10,303,123 | B1 | 5/2019 | Rogers et al. | |
| D912,551 | S | 3/2021 | Rogers et al. | |
| D915,224 | S | 4/2021 | Rogers et al. | |
| D956,582 | S | 7/2022 | Rogers et al. | |
| D967,718 | S | 10/2022 | Xu | |
| 2019/0146421 | A1 | 5/2019 | Rogers et al. | |
| 2021/0208543 | A1 | 7/2021 | Rogers et al. | |
| 2024/0176306 | A1 | 5/2024 | Rogers et al. | |
| 2024/0310787 | A1 | 9/2024 | Rogers et al. | |
| 2025/0334927 | A1 * | 10/2025 | Rogers | G04B 45/0069 |

FOREIGN PATENT DOCUMENTS

| | | | |
|---|---|---|---|
| KR | 200458872 | Y1 | 3/2012 |
| KR | 102491424 | B1 | 1/2023 |
| KR | 102582179 | B1 | 9/2023 |

* cited by examiner 10
12
14
16
18
20
22
24
26
26
28
30
32
34
36
38
40
44
46
48
50
52
54
55
56
62
64
64
66
68
70

BRAILLE TIMER

CROSS REFERENCE TO RELATED APPLICATIONS

This application is a continuation-in-part of U.S. Design patent application Ser. No. 29/938,104 filed Apr. 18, 2024 and a continuation-in-part of U.S. Design patent application Ser. No. 29/962,860 filed Sep. 13, 2024. Each of these applications is fully incorporated by reference herein.

FIELD OF THE INVENTION

This invention relates generally to an apparatus and method for teaching time and, more particularly, to an apparatus and method of displaying remaining and elapsed time.

BACKGROUND OF THE INVENTION

Numerous timers show elapsed time in a visual form. U.S. Pat. No. 5,662,479 discloses a timer which discloses a disk which rotates to visualize the amount of time left from a sixty-minute period. As the disk rotates, the visible portion of the disk decreases, indicating to the user that a certain amount of time remains from the original time. The timer must be manually set at the beginning of the time period for any activity. A visually impaired operator may have difficulty knowing at which time to set the timer because he or she is unable to read the numbers on the face of the timer. For example, an operator may not know whether to set the timer to ten minutes or twenty minutes for an activity, such as getting dressed for school.

However, such timers are not practical for visually impaired individuals. Such individuals may be able to visualize the disk disappearing but are unable to initially set the timer because they cannot adequately see the numbers on the face of the timer.

There is a need for a visual timer using a rotating disk which may display a predetermined time necessary to complete an activity, which may be set by a visually impaired person.

Therefore, it would be desirable for a timer having a rotatable colored disk which rotates in front of a timer face with Braille characters for people who are visually impaired so they may set the timer initially.

SUMMARY OF THE INVENTION

According to one aspect of the invention, a braille timer for displaying remaining and elapsed time comprises a generally rectangular body having a generally rectangular front tray and a generally rectangular rear tray secured to the generally rectangular front tray. The generally rectangular front tray of the generally rectangular body has a recess.

The generally rectangular body has a battery compartment for storing at least one battery. The at least one battery powers a control module located between the generally rectangular front and rear trays of the generally rectangular body. The control module includes a shaft which rotates at a predetermined speed.

A rotatable colored disk is secured to the shaft, such that the rotatable colored disk rotates with the shaft. A background member is secured in the recess of the generally rectangular front tray in front of the rotatable colored disk. The background member has a slit through which a portion of the rotatable colored disk passes, such that a portion of the rotatable colored disk is visible to the user. Upon rotation of the shaft and expiration of time, a portion of the rotatable colored disk rotates behind the background member and becomes invisible to the user. In the preferred embodiment, the shaft and rotatable colored disk rotate in a clockwise direction as time elapses. However, the shaft and rotatable colored disk may rotate in the counterclockwise direction as time passes.

The colored disk has a positioner portion secured to the colored disk to enable a user to manually set the initial position of the rotatable colored disk to indicate a desired time to be elapsed.

The background member has indicia bumps extending outwardly from a face of the background member. The indicia bumps are radially outside the colored disk when the colored disk is visible in front of the background member. The indicia bumps represent numbers in Braille and are spaced 5 minutes apart on one embodiment. The background member has a slit through which the colored disk passes upon rotation of the shaft and colored disk, such that upon rotation of the shaft with time, a portion of the colored disk rotates in front of the background member.

The braille timer further comprises an annular ring extending outwardly from the face of the background member. The annular ring has a sufficient height to enable a portion of the colored disk to pass over the indicia bumps. The annular ring is radially inside the indicia bumps and outside a center button. The center button is secured to the shaft and rotates with the shaft. The annular ring enables the positioner portion of the colored disk to pass over the indicia bumps in one embodiment.

In a second aspect, a braille timer for displaying remaining and elapsed time comprises a generally rectangular body having a generally rectangular front tray and a generally rectangular rear tray secured to the generally rectangular front tray. The generally rectangular front tray of the generally rectangular body has a recess.

The generally rectangular body has a battery compartment for storing at least one battery. The at least one battery powers a control module located between the generally rectangular front and rear trays of the generally rectangular body. The control module includes a shaft which rotates at a predetermined speed.

A rotatable colored disk is secured to the shaft, such that the rotatable colored disk rotates with the shaft. A background member is secured in the recess of the generally rectangular front tray in front of the rotatable colored disk. The background member has a slit through which a portion of the rotatable colored disk passes, such that a portion of the rotatable colored disk is visible to the user. Upon rotation of the shaft and expiration of time, a portion of the rotatable colored disk rotates behind the background member and becomes invisible to the user. In the preferred embodiment, the shaft and rotatable colored disk rotate in a clockwise direction as time elapses. However, the shaft and rotatable colored disk may rotate in the counterclockwise direction as time passes.

The colored disk has a positioner secured to the colored disk to enable a user to manually set the initial position of the rotatable colored disk to indicate a desired time to be elapsed.

The background member has indicia bumps extending outwardly from a face of the background member. The indicia bumps are radially outside the colored disk when the colored disk is visible in front of the background member. The indicia bumps represent numbers in Braille and are spaced 5 minutes apart on one embodiment. The background member has a slit through which the colored disk passes upon rotation of the shaft and colored disk, such that upon rotation of the shaft with time, a portion of the colored disk rotates in front of the background member.

The braille timer further comprises an annular ring extending outwardly from the face of the background member. The annular ring has a sufficient height to enable the positioner to pass over the indicia bumps. The annular ring is radially inside the indicia bumps and outside a center button. The center button is secured to the shaft and rotates with the shaft. The annular ring enables the positioner of the colored disk to pass over the indicia bumps in one embodiment.

In a third aspect, a braille timer for displaying remaining and elapsed time comprises a generally rectangular body having a battery compartment for storing at least one battery. The braille timer further comprises a control module powered by the at least one battery and includes a rotatable shaft which rotates at a predetermined speed.

A colored disk is secured to the rotatable shaft, such that the colored disk rotates with the shaft. The braille timer further comprises a background member which has a slit through which a portion of the colored disk passes, such that a portion of the colored disk is visible to the user. Upon rotation of the shaft and expiration of time, a portion of the rotatable colored disk rotates behind the background member and becomes invisible to the user. In the preferred embodiment, the shaft and rotatable colored disk rotate in a clockwise direction as time elapses. However, the shaft and rotatable colored disk may rotate in the counterclockwise direction as time passes.

The braille timer further comprises a rotatable center button secured to the colored disk which rotates with the rotatable shaft. The rotatable center button has an arm to which an edge of the colored disk is attached. The arm enables a user to manually set the initial position of the colored disk to indicate a desired time to be elapsed.

The background member has indicia bumps extending outwardly from a face of the background member. The indicia bumps are radially outside the colored disk when the colored disk is visible in front of the background member. The indicia bumps represent numbers in Braille and are spaced 5 minutes apart on one embodiment. The background member has a slit through which the colored disk passes upon rotation of the shaft and colored disk, such that upon rotation of the shaft with time, a portion of the colored disk rotates in front of the background member.

The braille timer further comprises an annular ring extending outwardly from the face of the background member. The annular ring has a sufficient height to enable a portion of the colored disk to move along the annular ring and not get stuck on any of the indicia bumps.

The accompanying drawings, which are incorporated in and constitute a part of this specification, illustrate embodiments of the invention and, together with the summary of the invention given above, and the detailed description of the drawings given below, explain the principles of the present invention.

DETAILED DESCRIPTION OF THE INVENTION

Figure 1:
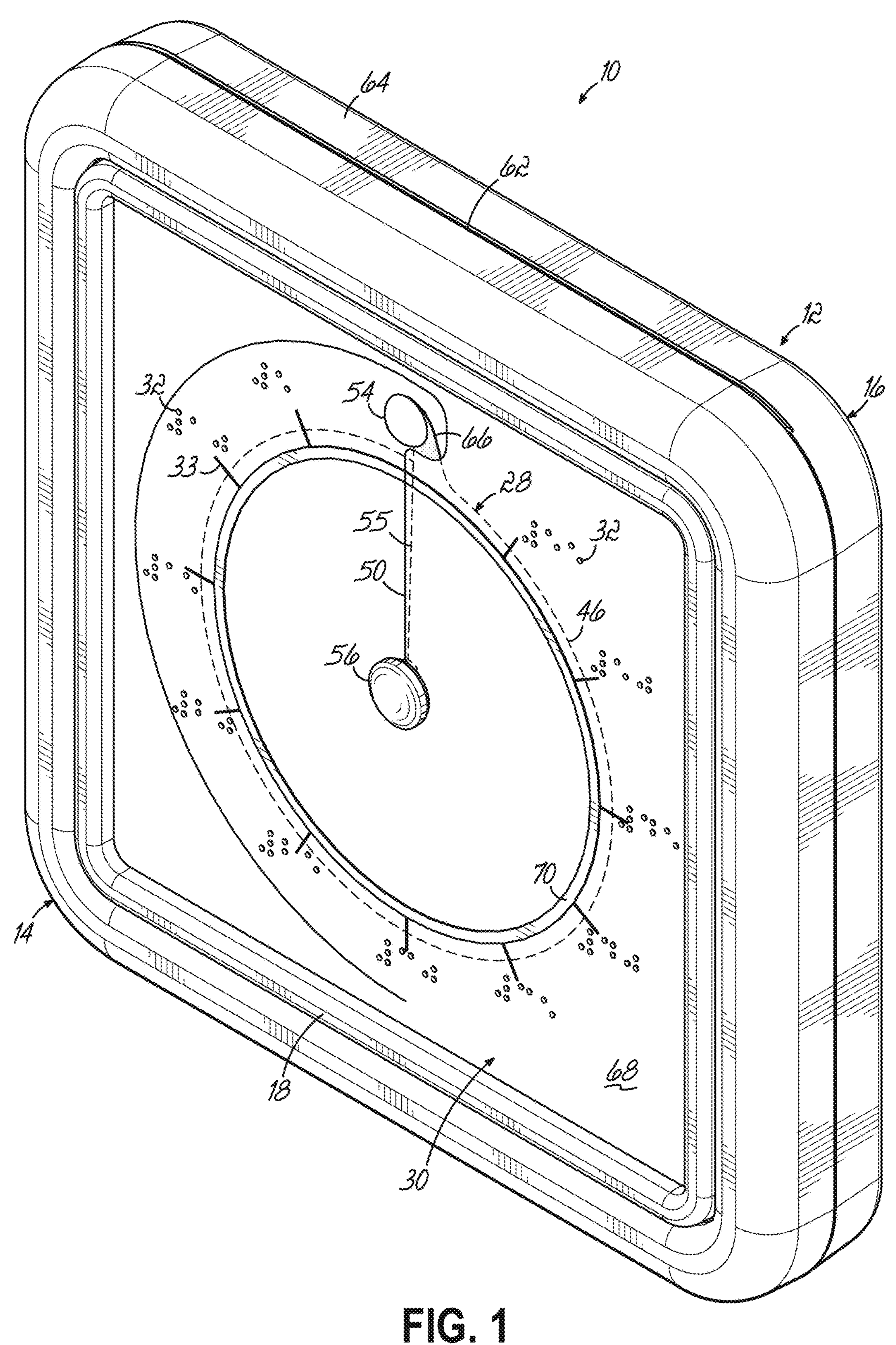
FIG. 1 is a front perspective view of a braille timer.
Figure 3:
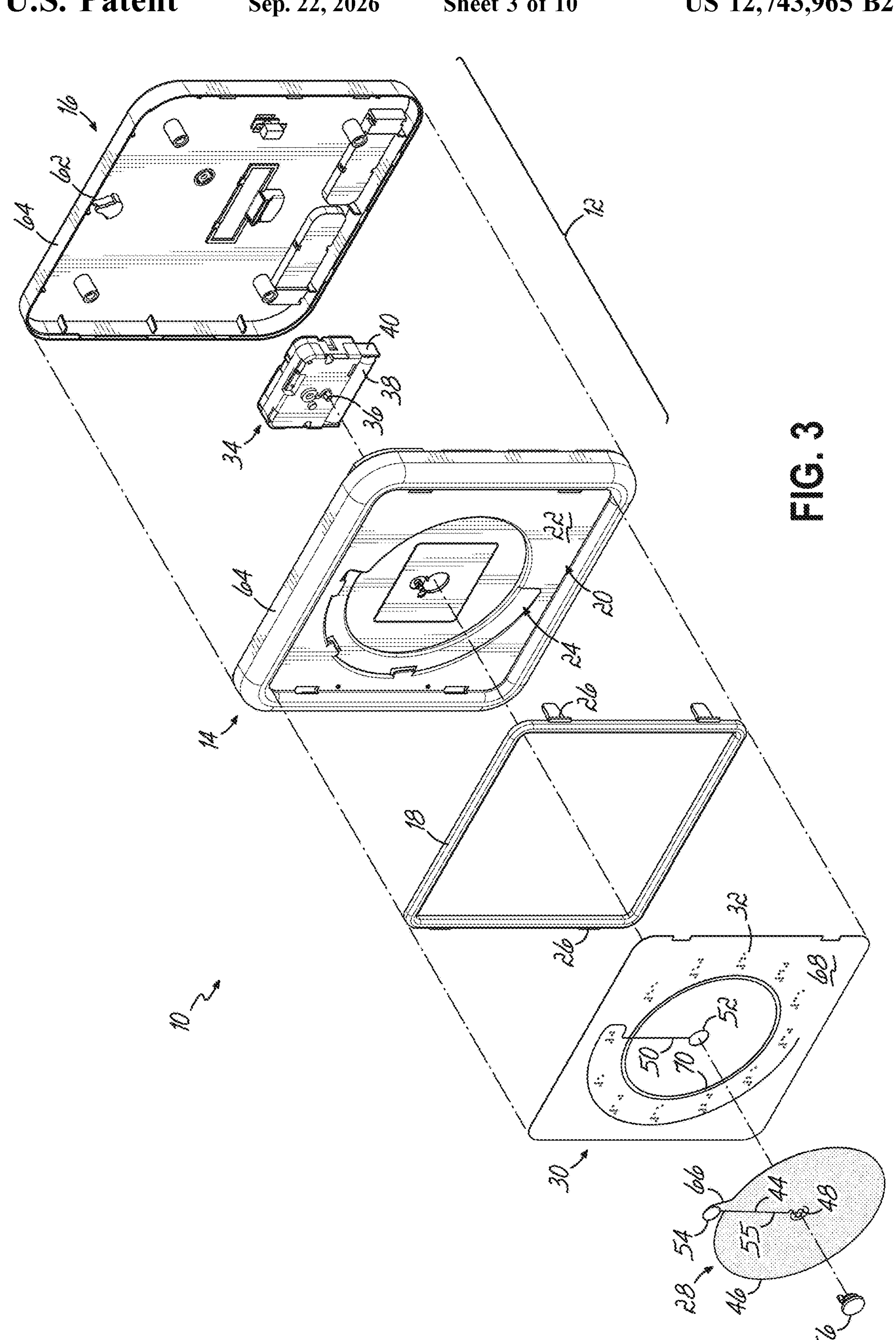
FIG. 3 is a partially disassembled view of the braille timer of FIG. 1.
Figure 4:
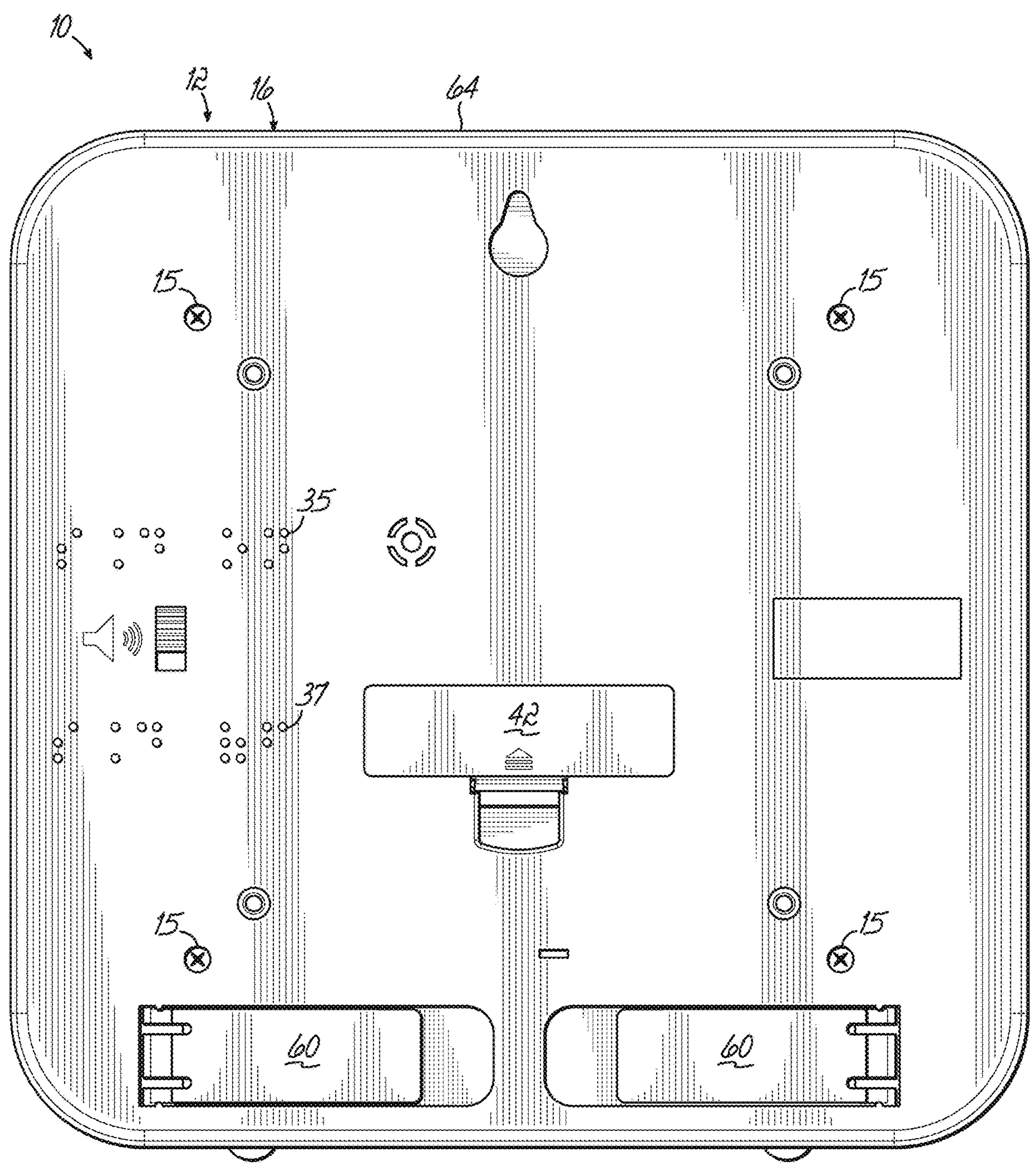
FIG. 4 is a rear view of the braille timer of FIG. 1.

Referring first to FIG. 1, there is illustrated a braille timer 10 incorporating the principles of the present invention. As best shown in FIG. 3, the braille timer 10 comprises a generally rectangular body 12, including a generally rectangular front tray 14 and a generally rectangular rear tray 16. For purposes of this document, the term "tray" is not intended to be limited by the drawings herein or any dictionary definition. As best shown in FIGS. 3 and 4, when assembled, the front and rear trays 14, 16 are secured together with any conventional means, including fasteners 15. See FIG. 4.

As best shown in FIG. 3, the front tray 14 of the braille timer 10 is a unitary molded plastic piece having a border 18 around the perimeter of a recess 20 having a floor 22. The border 18 extends forwardly from the floor 22. The floor 22 has a circular cavity 24 in which a colored disk 28 rotates, as described below.

Figure 2:
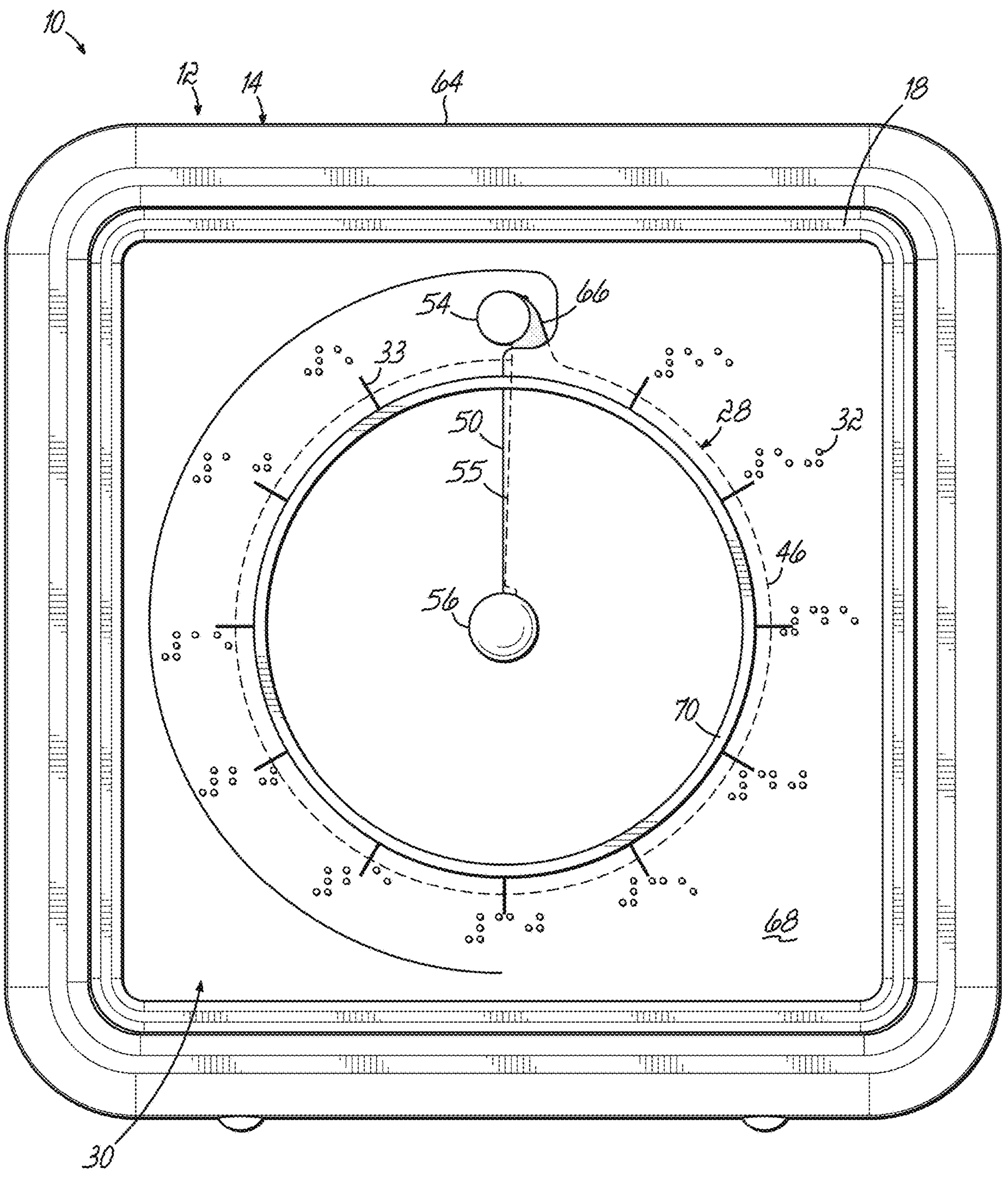
FIG. 2 is a front view of the braille timer of FIG. 1.

As best shown in FIG. 3, the border 18 has holders 26 integrally formed therein which function to hold a background member 30 inside the recess 20 of the front tray 14 as described below. The background member 30 has indicia bumps 32 printed thereon. The indicia bumps 32 are raised relative to the planar face 68 of the background member 30. Although line segments 33 representing time increments are illustrated as not being raised, they may be raised relative to the planar face 68 of the background member 30. Although one set of bumps 32 representing numbers in Braille is illustrated, any other numbers or symbols may be formed on the background member 30. As best shown in FIG. 2, the indicia bumps 32, and line segments representing time increments, are displayed outside the colored disk 28 even when the colored disk 28 is fully shown or exposed. In some embodiments, the indicia bumps 32 indicate five minute intervals and are spaced appropriately.

As best shown in FIG. 3, a control module 34 is held between the generally rectangular front tray 14 and the generally rectangular rear tray 16 in any known manner. The control module 34 includes a rotatable shaft 36 which rotates at a predetermined speed. As best shown in FIG. 3, the control module 34 is powered by at least one battery 38. The at least one battery 38 is held in a compartment 40 shown in FIG. 3 formed in the rear tray 16. As best shown in FIG. 4, the compartment 40 has a door 42 which may be removed to change a battery or batteries.

As best shown in FIG. 3, the circular-shaped colored disk 28 rotates in the circular cavity 24 of the floor 22 of the generally rectangular front tray 14. The colored disk 28 has a slit 44 extending inwardly from an outer edge 46 to a central opening 48. The central opening 48 is sized such that the rotatable shaft 36 of the control module 34 fits through the central opening 48. Because the colored disk 28 is secured to the rotatable shaft 36, they rotate at the same rate or speed. Thus, one full rotation of the rotatable shaft 36 equals one full rotation of the colored disk 28.

In front of the rotatable colored disk 28 is the background member 30 secured in the recess 20 of the generally rectangular front tray 14. The background member 30 has a slit 50 extending outwardly from a central opening 52. The central opening 52 is sized to allow the rotatable shaft 36 of the control module 34 to pass through it; but is not shaped to latch onto the rotatable shaft 36. Therefore, the background member 30 remains stationary and does not rotate with the rotatable shaft 36. The slit 50 is sized to allow a portion of the rotatable colored disk 28 to pass in front of the background member 30 to become visible and indicate elapsed or remaining time.

Another component of the braille timer 10 is a positioner 54 secured to the colored disk 28 of the control module 34. More particularly, the positioner 54 is located along the traveling edge 55 of the colored disk 28. By moving the positioner 54 manually in a direction opposite to the direction of rotation of the rotatable shaft 36 and colored disk 28, a user may set the time to elapse. In the embodiment illustrated, the rotatable shaft 36 is rotated in a clockwise direction by the control module 34, and the positioner 54 may be manually moved by a user in a counterclockwise direction.

Figure 5:
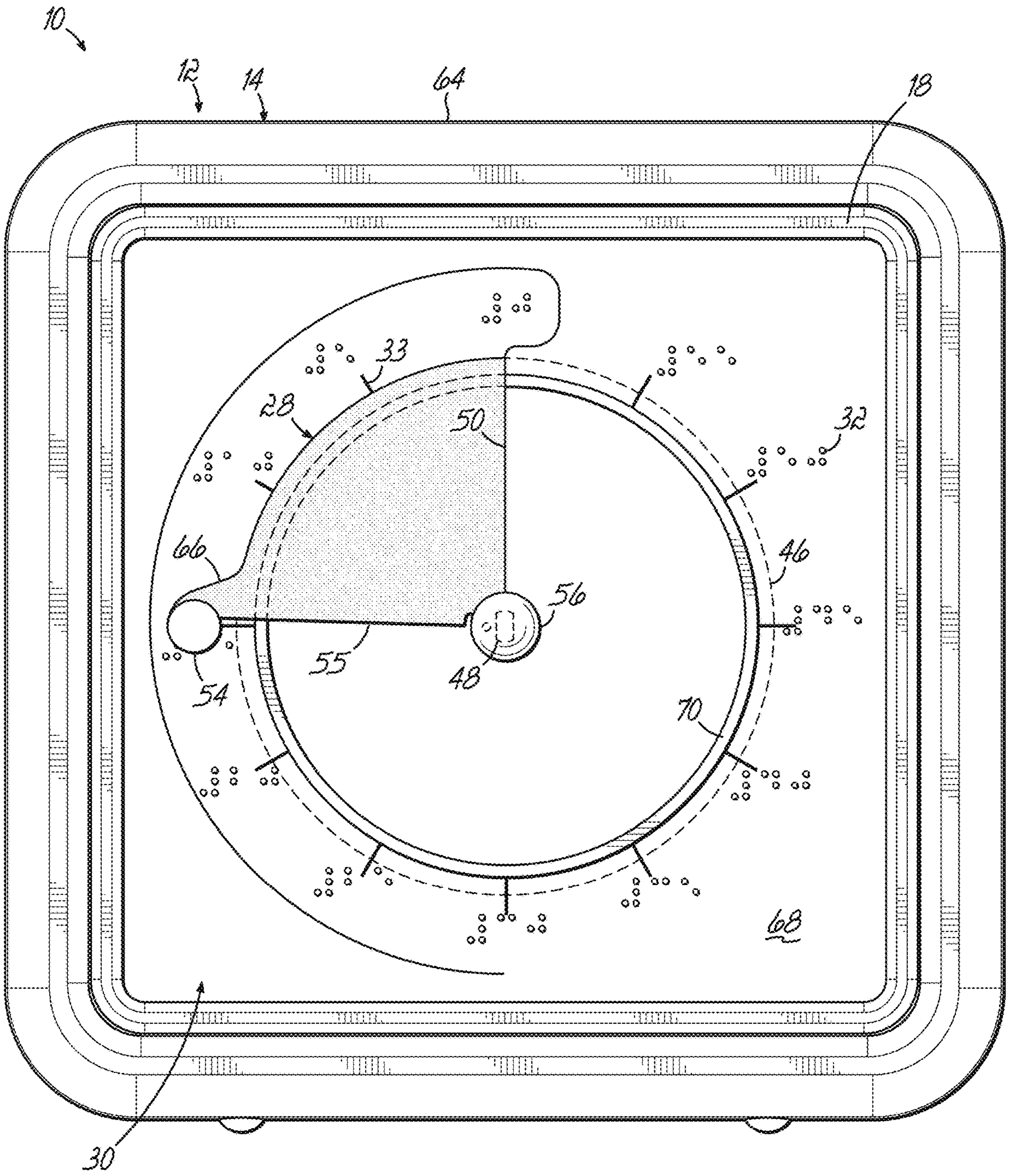
FIG. 5 is a front view of the braille timer of FIG. 1 showing a traveling edge of the colored disk being at a nine o'clock position.
Figure 6:
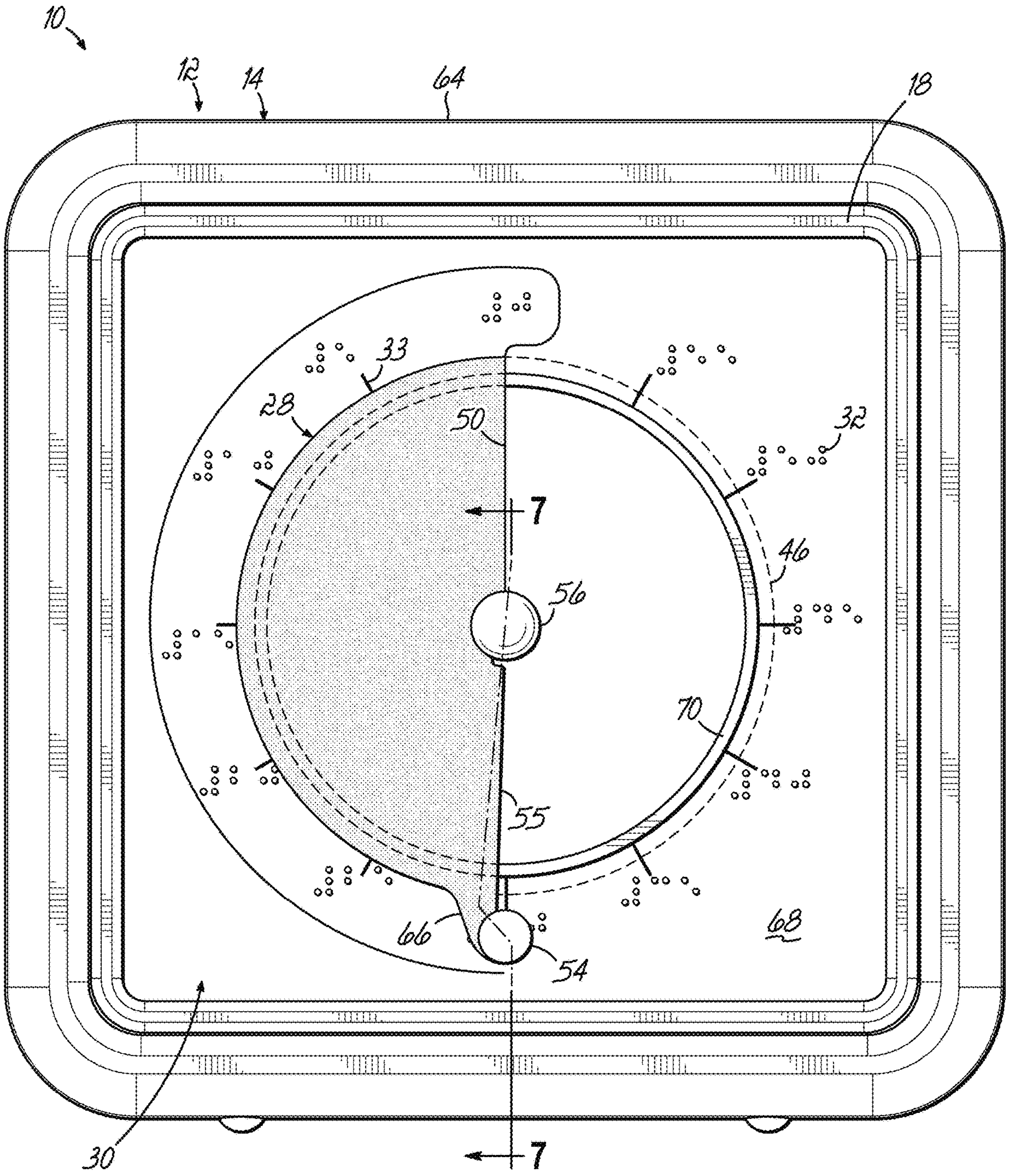
FIG. 6 is a front view of the braille timer of FIG. 1 showing a traveling edge of the colored disk being at a six o'clock position.
Figure 7:
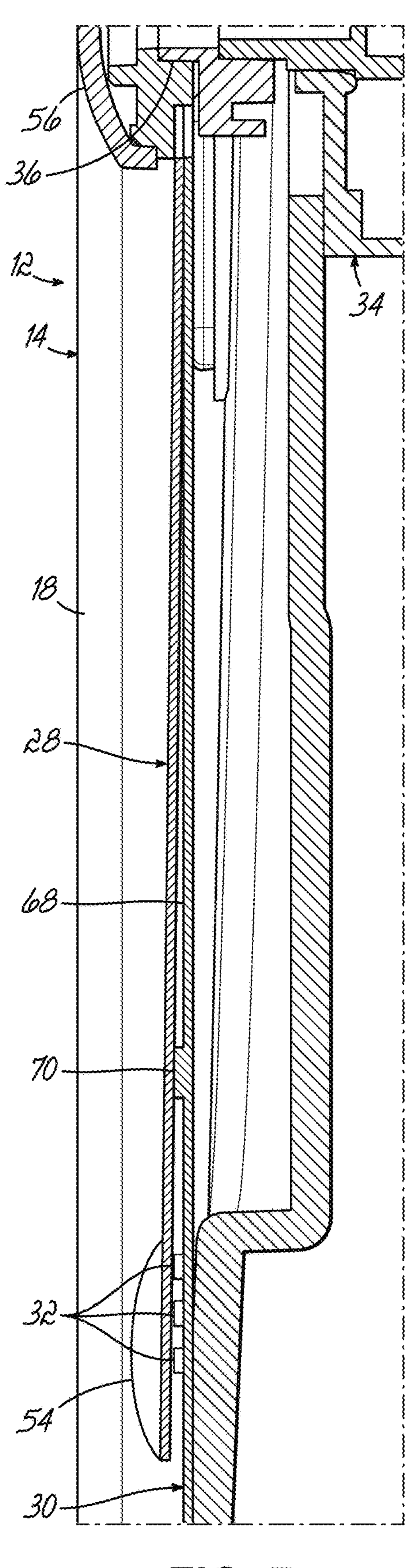
FIG. 7 is a cross-sectional view taken along the line 7-7 of FIG. 6.
Figure 8:
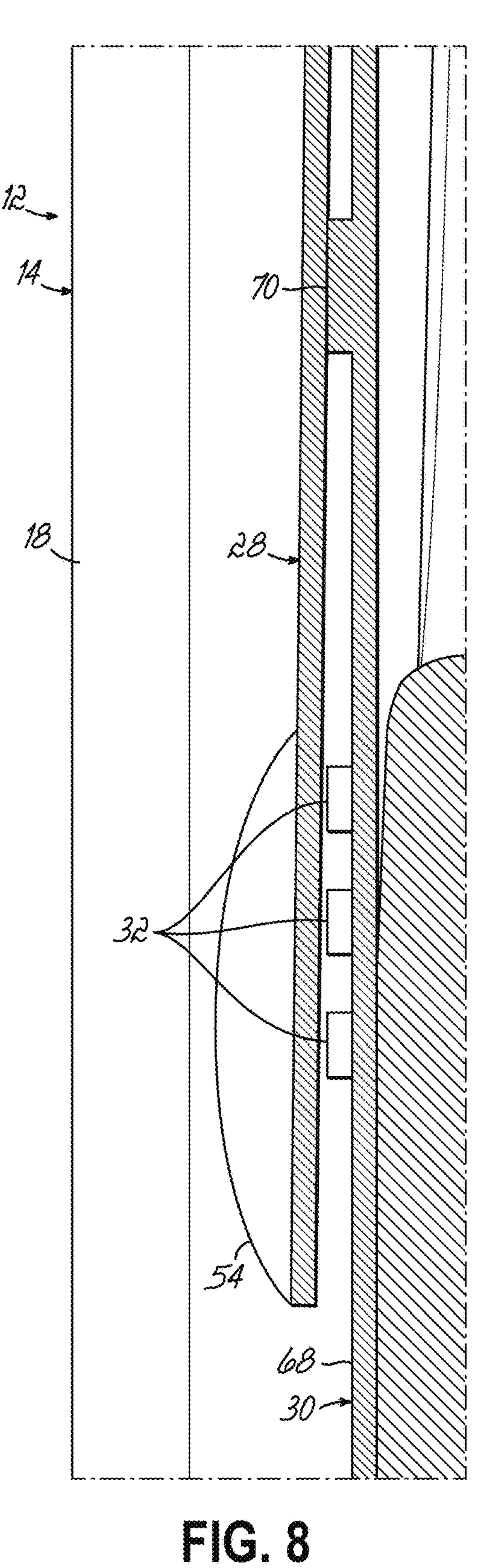
FIG. 8 is an enlarged cross-sectional view of a portion of FIG. 7.

As best shown in FIGS. 3 and 5, a rotatable center button 56 is secured to the rotatable shaft 36 and rotates with the colored disk 28. When a user initially moves the positioner 54 to a desired starting position with a portion of the colored disk 28 exposed or visible in front of the background member 30, the rotatable center button 56 moves in the same counter-clockwise direction as the positioner 54. For example, FIG. 5 shows the positioner 54 and traveling edge 55 of the colored disk 28 at the nine o'clock position with approximately a quarter of the colored disk 28 exposed or visible in front of the background member 30. FIG. 6 shows the positioner 54 and traveling edge 55 of the colored disk 28 at the six o'clock position with approximately a half of the colored disk 28 exposed or visible in front of the background member 30.

As best shown in FIG. 4, retractable legs 60 may be secured to the generally rectangular rear tray 16 in any known manner. In some embodiments, the retractable legs may be omitted; in other embodiments they may be other shapes and/or sizes.

As best shown in FIG. 4, braille bumps 35 may extend outwardly from the rear tray 16 above the on/off button. Similarly, braille bumps 37 may extend outwardly from the rear tray 16 below the on/off button. The braille bumps 35, 37 may communicate any desired message such as sound on/sound off.

As best illustrated in FIGS. 1 and 5, the generally rectangular body 12 of the braille timer 10 has a slot 62 extending along an upper surface 64 thereof. In some embodiments, the slot 62 may be omitted or absent. This slot 62 is described in detail in U.S. Pat. No. 11,934,155, which is fully incorporated by reference herein.

The braille timer 10 further comprises an annular ring 70 which is raised relative to the planar face 68 of the background member 30. Stated another way, the annular ring 70 extends outwardly from the planar face 68 of the background member 30. As best shown in FIGS. 1, 2 and 5, the annular ring 70 is located inside the indicia bumps 32 and outside the rotatable center button 56, so between the indicia bumps 32 and the rotatable center button 56. As best shown in FIGS. 5-8, the annular ring 70 enables the positioner 54 to pass over the top of the indicia bumps 32 without the indicia bumps 32 interfering with the rotation or travel of the colored disk 28. As best shown in FIGS. 5 and 6, the colored disk 28 may have a positioner portion or extension 66 which terminates in positioner 54. The annular ring 70 allows the colored disk 28 to be in a raised position so the positioner portion or extension 66 of the colored disk 28 may pass over the top of the indicia bumps 32 without getting hung up or stopped. The annular ring 70 further allows the positioner 54 to pass over the top of the indicia bumps 32 without getting hung up or stopped. Thus, the annular ring 70 ensures safe and smooth rotation of the colored disk 28 regardless of the size and shape of the positioner 54 and colored disk 28.

FIG. 9-12 illustrate an alternative embodiment of braille timer 10*a*. For the same of simplicity like parts will be indicated by like numbers. The braille timer 10*a* is identical to braille timer 10 but has no positioner. Instead, braille timer 10*a* has a circular, colored disk 28*a* without any extension. The rotatable center button 56*a* has an arm 72 extending radially outwardly from a center portion 74 of the center button 56*a* for rotating the rotatable center button 56*a*. The arm 72 is secured to a traveling edge of the colored disk 28*a* and has a projection 76 at the distal end thereof. The arm 72 functions to set the initial position of the braille timer 10*a*. The projection 76 of arm 72 is enlarged relative to the remainder of the arm 72 to facilitate moving the arm 72 to a desired position. Such position is typically the initial set position. The operator may push/move the projection 76 with his or her finger until the colored disk 28*a* is in a desired position.

Figure 9:
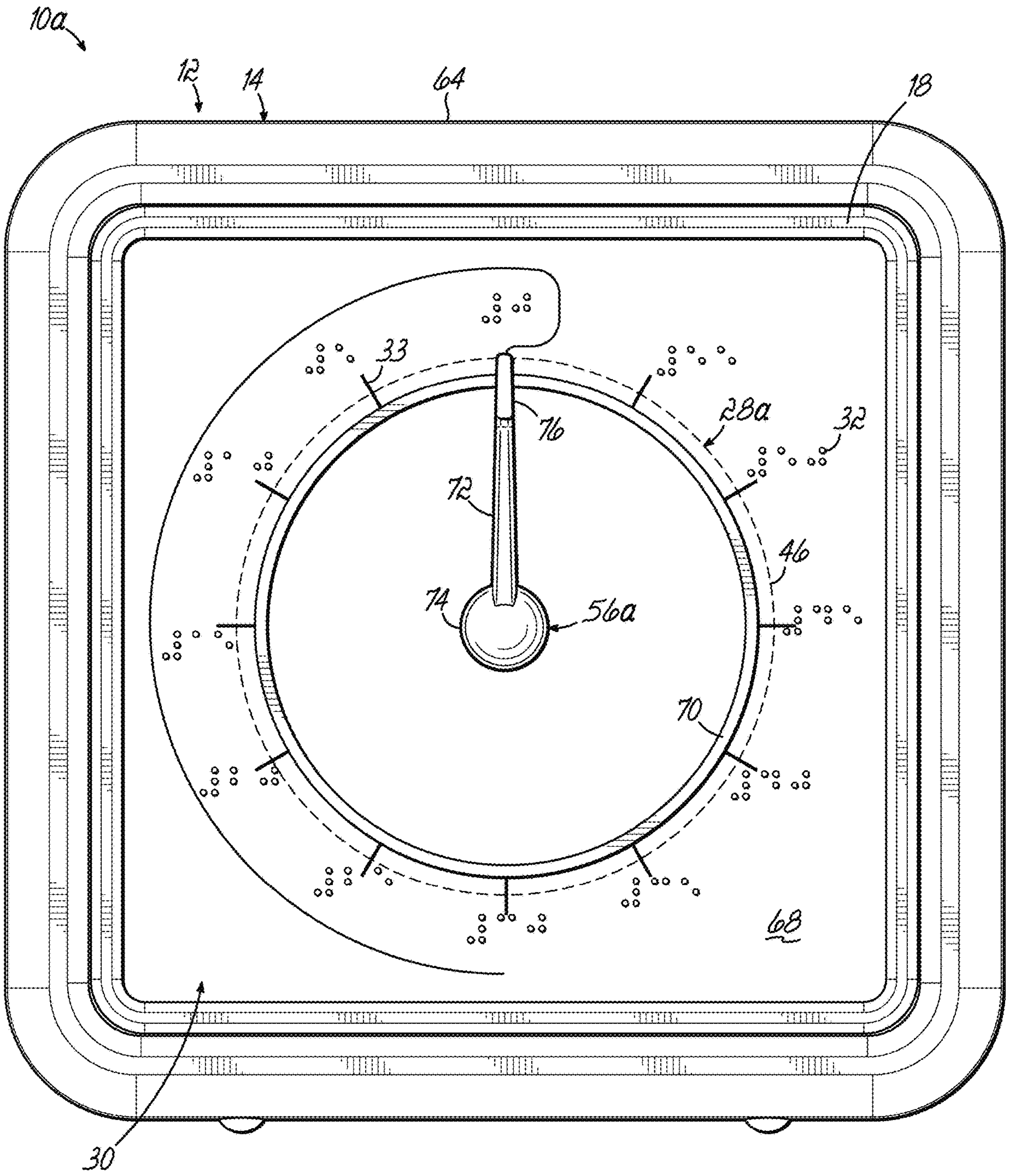
FIG. 9 is a front view of another embodiment of braille timer showing the rotatable button having an arm.
Figure 10:
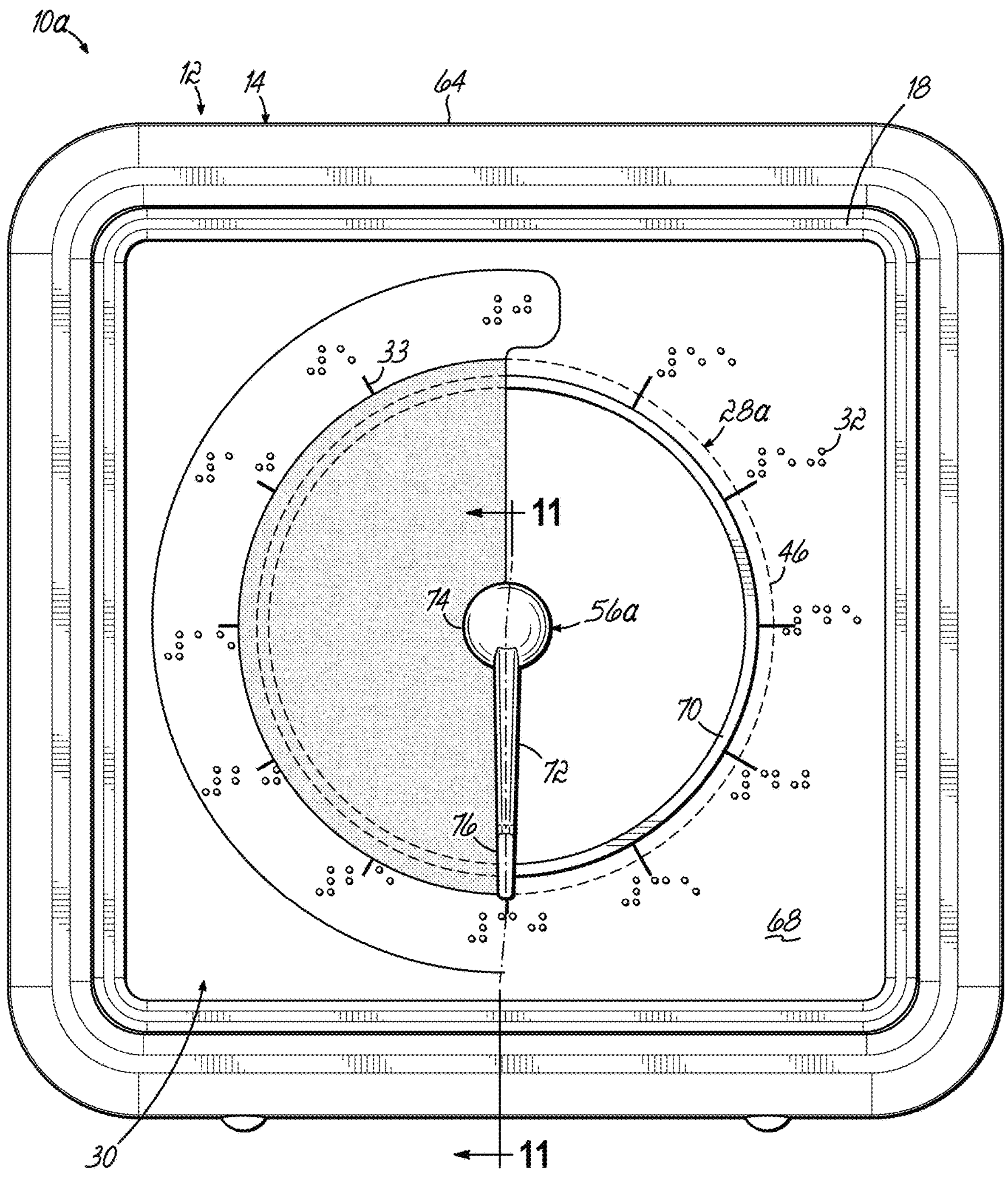
FIG. 10 is a front view of the braille timer of FIG. 9 showing a traveling edge of the colored disk secured to an arm of a rotatable center button, the arm being at a six o'clock position.

FIG. 9 illustrates the braille timer 10*a* in a home position before a time period to elapse is set. No portion of the colored disk 28*a* is visible when the braille timer 10*a* is in this home position. FIG. 9 also may represent the braille timer 10*a* after the desired time period has finished. FIG. 10 illustrates the braille timer 10*a* set to 30 minutes, according to one embodiment. With other control modules, the braille timer 10*a* may be initially set to 15 minutes, 45 minutes or some other desired time period by a user manually moving the arm 72 of the rotatable center button 56*a*.

Figures 11, 12:
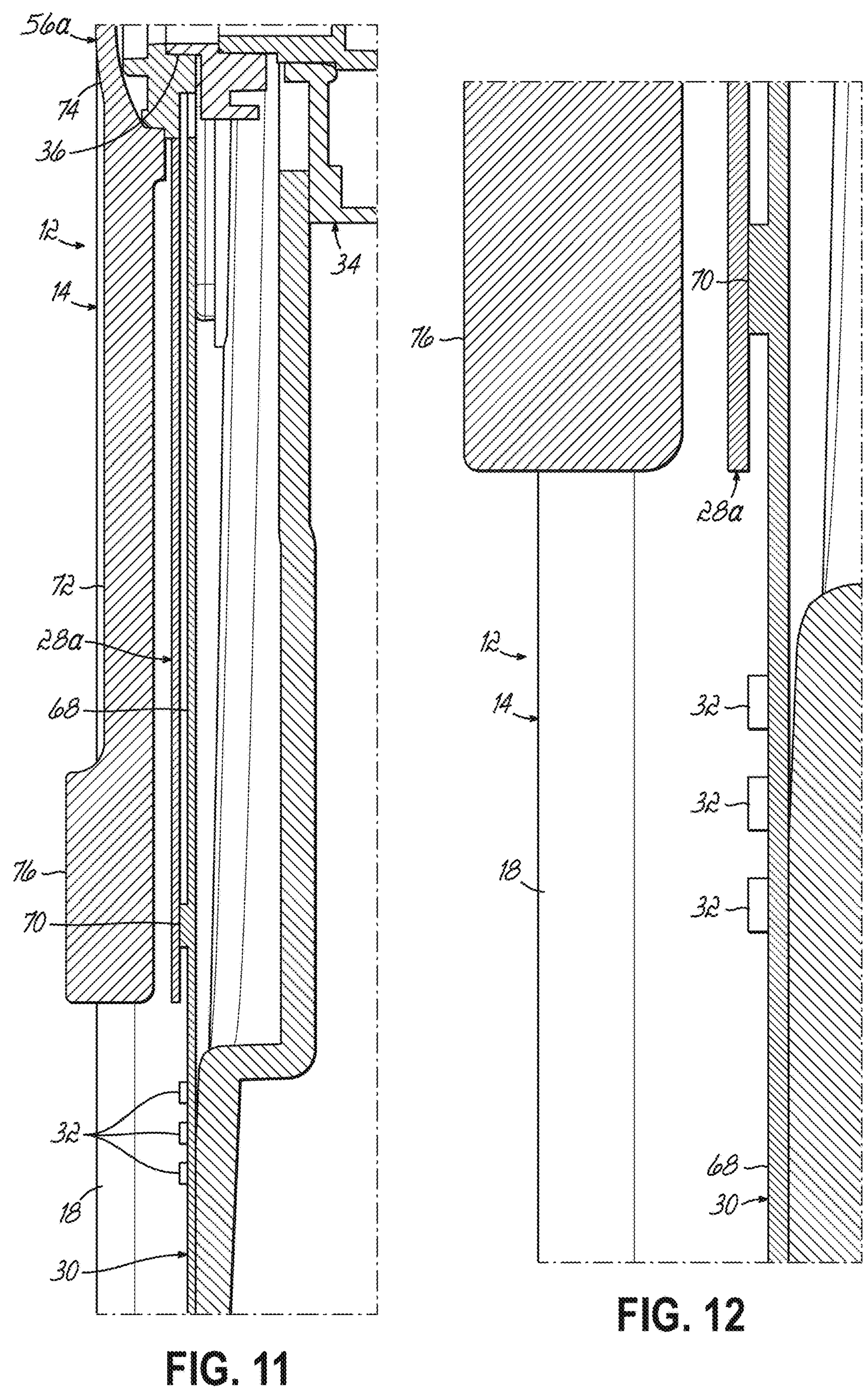
FIG. 11 is a cross-sectional view taken along the line 11-11 of FIG. 12.
FIG. 12 is an enlarged cross-sectional view of a portion of FIG. 11.

Although FIGS. 11 and 12 show the circular, colored disk 28*a* having a radius such that the indicia bumps 32 are outside the circular, colored disk 28*a*; the circular, colored disk 28*a* may have a larger radius. The existence of the raised annular ring 70 allows for free, uninterrupted rotation of the circular, colored disk 28*a* without interference from the indicia bumps. In any of the embodiments shown or described herein, the height of the raised annular ring 70 may be at least equal to the height of the raised indicia bumps 32 of the background member 30.

The various embodiments of the invention shown and described are merely for illustrative purposes only, as the drawings and the description are not intended to restrict or limit in any way the scope of the claims. Those skilled in the art will appreciate various changes, modifications, and improvements which can be made to the invention without departing from the spirit or scope thereof. The invention in its broader aspects is therefore not limited to the specific details and representative apparatus and methods shown and described. Departures may therefore be made from such details without departing from the spirit or scope of the general inventive concept. For example, the annular ring may be a different height than the height illustrated. The invention resides in each individual feature described herein, alone, and in all combinations of any and all of those features. Accordingly, the scope of the invention shall be limited only by the following claims and their equivalents.

What is claimed is:

1. A braille timer for displaying remaining and elapsed time comprising:
   - a generally rectangular body comprising a generally rectangular front tray and a generally rectangular rear tray secured to the generally rectangular front tray, the generally rectangular front tray having a recess, the generally rectangular body having a battery compartment for storing at least one battery;
   - a control module located between the generally rectangular front and rear trays of the generally rectangular body, the control module being powered by said at least one battery and including a rotatable shaft,
   - a colored disk secured to the rotatable shaft such that the colored disk rotates with the shaft, the colored disk having a positioner portion for manually setting a traveling edge of the colored disk;
   - a background member located in the recess of the generally rectangular front tray and having indicia bumps extending outwardly from a face of the background member, the background member having a slit through which a portion of the colored disk passes such that upon rotation of the shaft a portion of the colored disk rotates in front of the background member; and
   - an annular ring extending outwardly from the face of the background member, the annular ring having a sufficient height to enable a portion of the colored disk to pass over the indicia bumps.

2. The braille timer of claim 1, wherein the indicia bumps represent numbers.

3. The braille timer of claim 1, wherein the colored disk rotates in a clockwise direction as time elapses.

4. The braille timer of claim 1, further comprising a center button which rotates with the shaft.

5. The braille timer of claim 4, wherein the annular ring is between the indicia bumps and center button.

6. The braille timer of claim 1, wherein the annular ring is inside the indicia bumps.

7. A braille timer for displaying remaining and elapsed time comprising:
   - a generally rectangular body comprising a generally rectangular front tray and a generally rectangular rear tray secured to the generally rectangular front tray, the generally rectangular front tray having a recess, the generally rectangular body having a battery compartment for storing at least one battery;
   - a control module located between the generally rectangular front and rear trays of the generally rectangular body, the control module being powered by said at least one battery and including a rotatable shaft,
   - a colored disk secured to the rotatable shaft such that the colored disk rotates with the shaft;
   - a positioner secured to the colored disk for manually setting a traveling edge of the colored disk;
   - a background member located in the recess of the generally rectangular front tray and having indicia bumps extending outwardly from a face of the background member, the background member having a slit through which a portion of the colored disk passes such that upon rotation of the shaft a portion of the colored disk rotates in front of the background member; and
   - an annular ring extending outwardly from the face of the background member, the annular ring having a height to enable the positioner to pass over the indicia bumps.

8. The braille timer of claim 7, wherein the indicia bumps represent numbers.

9. The braille timer of claim 8, wherein the indicia bumps are located at five minute intervals.

10. The braille timer of claim 7, wherein the colored disk rotates in a clockwise direction as time elapses.

11. The braille timer of claim 7, further comprising a center button coupled to the shaft which rotates with the shaft.

12. The braille timer of claim 11, wherein the annular ring is between the indicia bumps and center button.

13. The braille timer of claim 7, wherein the annular ring is inside the indicia bumps.

14. A braille timer for displaying remaining and elapsed time comprising:
   - a generally rectangular body having a battery compartment for storing at least one battery;
   - a control module powered by at least one battery and including a rotatable shaft,
   - a colored disk secured to the rotatable shaft such that the colored disk rotates with the shaft;
   - a background member having a face and indicia bumps extending outwardly from the face of the background member, the background member having a slit through which a portion of the colored disk passes such that upon rotation of the shaft a portion of the colored disk rotates in front of the background member;
   - a rotatable center button secured to the rotatable shaft which rotates with the rotatable shaft, the rotatable center button having an arm to which an edge of the colored disk is attached; and
   - an annular ring extending outwardly from the face of the background member, the annular ring having a sufficient height to enable a portion of the colored disk to move along the annular ring.

15. The braille timer of claim 14, wherein the generally rectangular body comprises a generally rectangular front tray and a generally rectangular rear tray secured to the generally rectangular front tray, the generally rectangular front tray having a recess.

16. The braille timer of claim 14, wherein the arm has a projection at an end thereof.

17. The braille timer of claim 14, wherein the arm extends radially outwardly from a center portion of the rotatable center button.

18. The braille timer of claim 14, wherein the indicia bumps are located at five minute intervals.

19. The braille timer of claim 14, wherein the annular ring is between the indicia bumps and center button.

* * * * *